United States Patent
Gal et al.

(10) Patent No.: US 8,672,236 B2
(45) Date of Patent: Mar. 18, 2014

(54) SPRINKLER

(75) Inventors: Izhak Gal, Kibbutz Na'an (IL); Eli Armon, Even Yehuda (IL); Rony Bartal, Rishon Lezion (IL); Moshe Gorny, Kibbutz Na'an (IL)

(73) Assignee: Naandan Jain Irrigation C.S Ltd., Kibbutz Na'an (IL)

( * ) Notice: Subject to any disclaimer, the term of this patent is extended or adjusted under 35 U.S.C. 154(b) by 463 days.

(21) Appl. No.: 13/057,353

(22) PCT Filed: Jul. 28, 2009

(86) PCT No.: PCT/IL2009/000733
§ 371 (c)(1),
(2), (4) Date: Feb. 3, 2011

(87) PCT Pub. No.: WO2010/016053
PCT Pub. Date: Feb. 11, 2010

(65) Prior Publication Data
US 2011/0132997 A1    Jun. 9, 2011

Related U.S. Application Data

(60) Provisional application No. 61/129,972, filed on Aug. 4, 2008.

(51) Int. Cl.
*B05B 3/02* (2006.01)
*F23D 11/04* (2006.01)
*B05B 3/14* (2006.01)

(52) U.S. Cl.
USPC ............. 239/222.15; 239/214; 239/222.11; 239/222.13; 239/230

(58) Field of Classification Search
USPC .......... 239/230, 214, 222.11, 222.15, 222.17, 239/231–233
See application file for complete search history.

(56) References Cited

U.S. PATENT DOCUMENTS 533,367 A * 1/1895 McBoyle .................... 239/510
2,904,261 A * 9/1959 Johnson ....................... 239/230
(Continued)

FOREIGN PATENT DOCUMENTS

AU    539957 B2    10/1984
GB    2 006 050 A    5/1979

OTHER PUBLICATIONS

Written Opinion of the International Searching Authority, International Application No. PCT/IL2009/000733, six (6) pages, mailed Dec. 28, 2009.

(Continued)

*Primary Examiner* — Len Tran
*Assistant Examiner* — Alexander M Valvis
(74) *Attorney, Agent, or Firm* — Vorys, Sater, Seymour and Pease LLP; Susanne M. Hopkins; William L. Klima

(57) ABSTRACT

Provided is a sprinkler configured for irrigation of a predetermined area, the sprinkler including a sprinkler body having a central axis. The body is formed with an irrigation inlet configured for receiving irrigation fluid, and a nozzle configured for discharging therethrough a directional jet of the irrigation fluid. The sprinkler further includes a reciprocal element configured for performing a reciprocal rotary motion about the central axis, and a deflecting member including an attachment mechanism for fixed attachment thereof to the reciprocal element. The deflecting member is formed with at least a first deflective surface, and is configured for performing a reciprocal rotary motion about the central axis together with the reciprocal element. The deflecting member is configured to assume at least a first position with respect to the nozzle in which a first portion thereof faces the nozzle, by virtue of which the directional jet is emitted from the sprinkler at a first angle, and at least a second position with respect to the nozzle in which a second portion thereof faces the nozzle, by virtue of which the directional jet is emitted from the sprinkler at a second angle different from the first angle.

19 Claims, 13 Drawing Sheets

(56) References Cited

U.S. PATENT DOCUMENTS

| | | | | |
|---|---|---|---|---|
| 3,856,207 A | * | 12/1974 | Rees, Jr. | 239/230 |
| 3,930,617 A | * | 1/1976 | Dunmire | 239/230 |
| 4,000,853 A | * | 1/1977 | Drori | 239/230 |
| 4,033,510 A | * | 7/1977 | Jennison et al. | 239/230 |
| 4,205,788 A | * | 6/1980 | Bruninga | 239/233 |
| 4,453,673 A | * | 6/1984 | Icenbice | 239/236 |
| 4,497,441 A | * | 2/1985 | Chow | 239/230 |
| 4,537,356 A | * | 8/1985 | Lawson | 239/230 |
| 4,632,312 A | * | 12/1986 | Premo et al. | 239/230 |
| 4,858,829 A | * | 8/1989 | Drechsel | 239/230 |
| 4,978,070 A | * | 12/1990 | Chow | 239/230 |
| 4,984,740 A | * | 1/1991 | Hodge | 239/232 |
| 5,031,835 A | * | 7/1991 | Rojas | 239/230 |
| 5,209,404 A | * | 5/1993 | Jun | 239/230 |
| 5,267,689 A | | 12/1993 | Forer | |
| 5,370,311 A | * | 12/1994 | Chen | 239/233 |
| 5,671,886 A | | 9/1997 | Sesser | |
| 7,014,125 B2 | * | 3/2006 | Lerner | 239/225.1 |
| 7,841,545 B2 | * | 11/2010 | Wang | 239/230 |

OTHER PUBLICATIONS

Notification of Transmittal of the International Search Report and the Written Opinion of the International Searching Authority, or the Declaration, International Application No. PCT/IL2009/000733, eight (8) pages, mailed Dec. 28, 2009.

"Models AR3/AR3-LA Impact Sprinklers," Irritrol Systems, 4.11, one (1) page.

* cited by examiner

SPRINKLER

This is a National Phase Application filed under 35 U.S.C. 371 as a national stage of PCT/IL2009/000733, filed on Jul. 28, 2009, an application claiming the benefit under 35 USC 119(e) of U.S. Provisional Application No. 61/129,972, filed on Aug. 4, 2008, the content of each of which is hereby incorporated by reference in its entirety.

FIELD OF THE INVENTION

This invention relates to sprinkler deflectors, in particular deflectors for impact sprinklers, adapted to control angle and distance of deflection. The invention is further directed to sprinklers fitted with an impact deflector.

BACKGROUND OF THE INVENTION

Most impact sprinklers comprise a sprinkler body with a sprinkler nozzle, and a sprinkler arm mounted hingedly to the body to revolve about a central axis. The sprinkler arm (also known as 'hammer') is adapted to be operated by a jet emitted from the sprinkler nozzle. The hammer is generally formed with a curved portion designed such that impact of the jet upon this portion causes the hammer to perform a reciprocal rotary motion about the central axis, the rotary motion having enough momentum on the return, added with power of the directional jet, so as to cause rotation of the entire sprinkler body about the central axis.

It should be appreciated that during rotation of the sprinkler, the extent of each angular increment of rotation of the sprinkler is erratic/random, i.e. one increment is not equal to the next, whereby the nozzle of the sprinkler rarely returns to the same position upon completing a full 360° turn.

In the field of irrigation, especially irrigation by sprinklers, adapted to provide water to a predetermined area, it is usually desired to have a uniform spread of the irrigated substance, e.g. water, across the entire area. For this purpose, many sprinklers are provided with a splitter or deflector, adapted to split the water jet emitted from the sprinkler nozzle.

In some sprinklers, the hammer itself serves as a deflector, since upon impact of the jet on the curved portion of the hammer, deflection and/or splitting of the jet takes place.

In more advanced sprinkler, additional deflectors and splitters are employed to gain a wider spread of water along the horizontal plane, across the area to be irrigated. One example of such a sprinkler may be found in U.S. Pat. No. 4,453,673.

Several constructions have also been devised to deflect the water jet along the vertical plane as may be found in U.S. Pat. Nos. 7,014,125, and 5,671,886 to the Applicant, as well as U.S. Pat. Nos. 4,632,312, 5,267,689, and a product by Irritrol systems (code 1015005, model AR3-LA)

SUMMARY OF THE INVENTION

According to the present invention there is provided a sprinkler adapted to irrigate a predetermined area, said sprinkler comprising a sprinkler body having a central axis, and formed with a main irrigation inlet adapted for receiving irrigation fluid from a supply line and a nozzle adapted for discharging therethrough a directional jet of said irrigation fluid, said sprinkler further comprising a reciprocal element adapted to perform a reciprocal rotary motion about said central axis upon impact of said directional jet during periodical rotary motion of said sprinkler body, and wherein said reciprocal element comprises a deflecting member designed to move together therewith, and adapted for deflecting said jet along a plane essentially perpendicular to said central axis.

According to a particular design embodiment, said sprinkler is an impact sprinkler and said reciprocal element is a hammer constituting a part of a motion generating mechanism adapted for imparting rotary motion to said impact sprinkler. Alternatively, said sprinkler may comprise a separate motion generating mechanism, wherein said reciprocal element is only adapted for reciprocal movement under the influence of said directional jet, and not for imparting rotary motion to said sprinkler.

Said sprinkler body may have an essentially tubular shape extending along said central axis, wherein said main inlet is located along said central axis and said nozzle is defined about an auxiliary axis angled to said central axis and intersecting therewith. Said sprinkler body is designed such that when the sprinkler is positioned with said central axis perpendicular to the ground, the angle between the central and auxiliary axis is acute, such that said nozzle is directed upwards.

Said sprinkler body may be formed with an attachment port adapted for receiving said motion generating mechanism in a freely rotational manner allowing said periodical rotary motion, said attachment port being optionally located opposite said main inlet along said central axis. Said sprinkler body may also be formed with a limiting arrangement adapted to determine the maximal angular range of the rotary motion performed by said motion generating mechanism, as known per se.

Said motion generating mechanism is adapted to perform a reciprocal rotary motion about said central axis, entailing rotary motion of said sprinkler about said central axis in order to direct said nozzle, and consequently the jet emitted therefrom, in a circular pattern. During this rotary motion, the directional jet is periodically deflected in the horizontal plane.

Said motion generating mechanism may be in the form of an elongated arm (hereinafter also referred to as a hammer) having a first and a second end, and an attachment port formed along said arm between said first and said second end. The arm may further be formed with a deflective wall extending essentially perpendicular to the longitudinal extension of the arm. The arrangement is such that when attached to said sprinkler body, said arm extends radially from the central axis, and said deflective wall extends essentially parallel to said central axis as known per se.

Said deflecting member may be formed with at least a first deflective surface, and may be articulated to said arm such that said deflective surface is disposed at least partially circumferentially about said central axis. When articulated to said arm, the deflective surface of said deflecting member may be disposed above said nozzle and be essentially angled to the auxiliary axis of the nozzle, i.e. to the direction of the jet emitted therefrom. Alternatively, said deflecting member may be articulated to the arm such that the deflective surface is disposed below said nozzle.

In operation, rotary motion of the arm about the central axis of the sprinkler, entails rotary motion of said deflecting member about the central axis along with said arm so as to bring said deflecting member to various positions with respect to said nozzle, including a position in which it may obstruct the nozzle and come in contact with said directional jet, thereby deflecting said jet, inter alia, along the vertical plane.

It should be appreciated that such a deflection along the vertical plane effectively changes the range of irrigation of the sprinkler, by way of limiting the directional jet.

Design variations of the deflecting member according to the present invention may include a deflective wall in the form of any one of the following:

- a continuous planar deflective surface, wherein the deflecting member is articulated to the arm such that said deflective surface has a fixed deflection angle, whereby upon obstruction of said directional jet, the angle by which said jet is deflected is the same regardless of the point of impact thereof on the deflective surface;
- a continuous planar deflective surface, wherein the deflecting member is articulated to the arm such that said deflective surface has a varying deflection angle, i.e. upon obstruction of said directional jet, the angle by which said jet is deflected is dependent on the point of impact thereof on the deflective surface;
- a continuous non-planar deflective surface having multiple curvature radii, whereby upon obstruction of said directional jet, the angle by which said jet is deflected is dependent on the point of impact thereof on the deflective surface; and
- a plurality of deflective sub-surfaces, each having a different angle with respect to the central axis, whereby upon obstruction of said directional jet, the angle by which said jet is deflected is dependent on the deflective sub-surface which the jet impacts. It should be appreciated that each of the deflective sub-surfaces may possess characteristics similar to those of the deflective surface described with respect to the previous design variations.

According to a particular design embodiment of the present invention, said deflecting member is optionally made of a flexible material, e.g. silicone, whereby the angle of deflection of said directional jet is affected by the impact of the jet on the flexible deflecting member and the change of shape resulting in such impact. In particular, only said deflective surface may be made of flexible material and be connected to a rigid deflecting member.

According to still another design variation, said deflecting member may be substantially rigid, and comprise a plurality of flexible deflective sub-surfaces in the form of sheets of flexible material.

It should also be appreciated that with respect to all of the above embodiments, said deflecting member may be designed such that when mounted onto the reciprocal element, it may reach an intermediate position in which the directional jet impacts the edge of the deflecting member, i.e. only a part of the cross-section of the jet perpendicular to its emission direction actually impacts the deflective surface. In such case, part of the jet may be deflected by the deflective surface while the other part is free to discharge from the nozzle without obstructions and acquire its full irrigation range.

According to yet another specific design variation said deflecting member may be so designed as to be mounted on the arm such that a clearance exists along the circumferential direction between the deflective wall of the motion generating mechanism and the deflective surface of the deflecting member. Such an arrangement may provide a time interval in which a directional jet is emitted from the nozzle which is unobstructed by the deflecting member.

Said deflecting member may be attached to said arm in a detachably attachable manner, for example by snap fitting. This may allow said sprinkler to become modular, wherein for each irrigation area, a different deflecting member may be chosen, having angles specifically designed for said predetermined area.

In addition, it should also be appreciated that due to the downward deflecting properties applicable by the present invention, a higher water pressure may be used without exceeding the circumference of the area to be irrigated.

It should be appreciated that since the extent of each angular increment of the sprinkler during its rotation is not equal to the next, and since the deflecting member is fixedly attached to the rotating arm, the irrigation range varies constantly. In other words, upon completing a full 360° turn, the sprinkler will not return to the same irrigation range.

According to another aspect of the present invention there is provided a deflecting member for a motion generating mechanism, comprising a body formed with at least a first deflective surface, said deflecting member further comprising an attachment mechanism adapted for attachment thereof to a deflecting arm of said motion generating mechanism.

BRIEF DESCRIPTION OF THE DRAWINGS

In order to understand the invention and to see how it may be carried out in practice, embodiments will now be described, by way of non-limiting examples only, with reference to the accompanying drawings, in which.

DETAILED DESCRIPTION OF EMBODIMENTS

Figure 1:
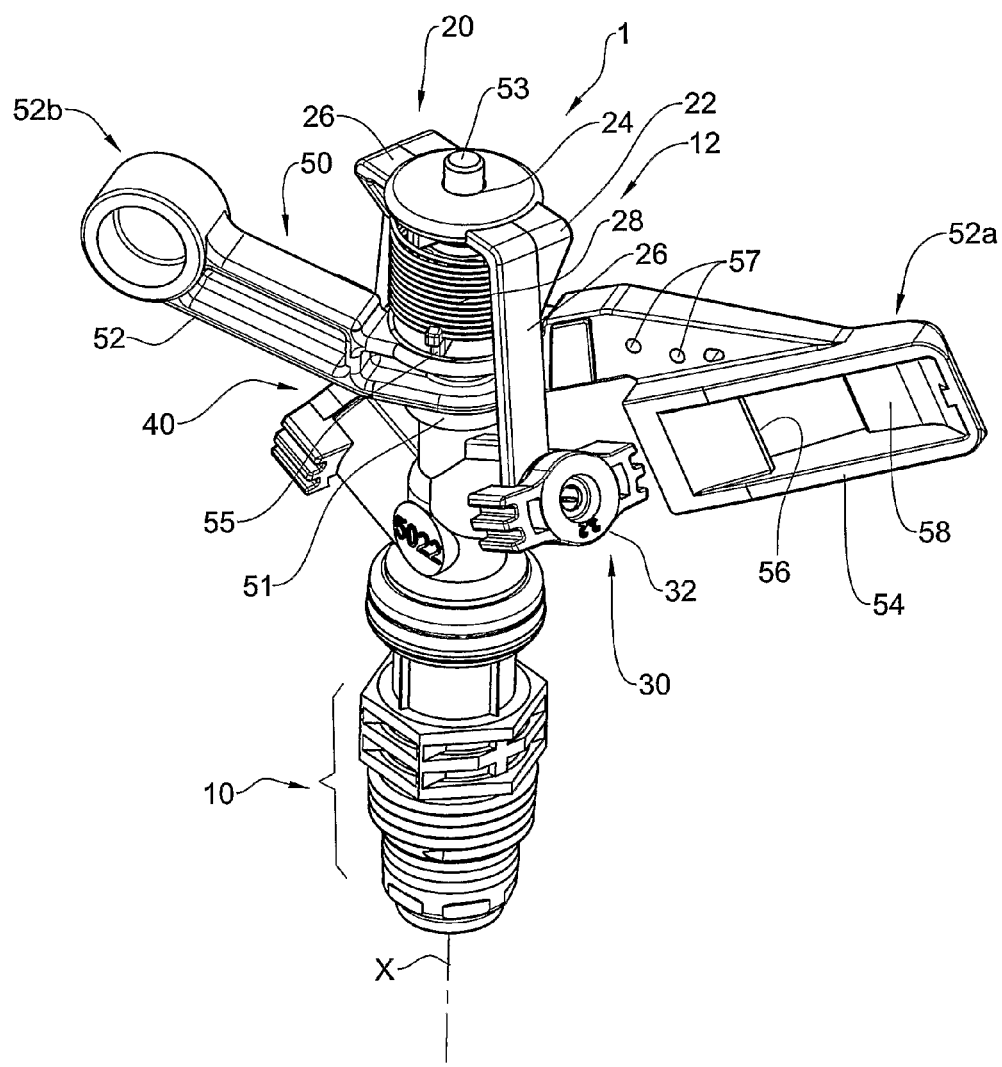
FIG. 1 is an isometric view of a standard impact sprinkler known in the art.

With reference to FIG. 1, a standard impact sprinkler generally designated 1 is shown comprising a cylindrical sprinkler base connector 10 having a central axis X, a sprinkler body 12 rotatable with respect to the base connector 10, and formed with a hammer frame 20, a first irrigation nozzle 30, a second irrigation nozzle 40 and a hammer 50.

The sprinkler body 12 is formed with a central channel (not seen) being in fluid communication with the irrigation nozzles 30, 40, and has a seating arrangement (not seen) for the hammer 50. The hammer frame 20 is formed with a top wall 22 having a central aperture 24 aligned with the central axis X, and two side walls 26. It should be noted that the second irrigation nozzle 40 may also be closed to provide for different irrigation regimes as known per se.

The hammer 50 comprises hammer body 52 formed with a central seat 51, a top pin 53 and a spring seating 55, all three being coaxially aligned. The hammer body 52 is formed with a moment generating portion 52a, and a counterpart portion 52b, formed at respective ends of the hammer body 52. The moment generating portion 52a is formed with a frame 54, a first inclined wall 56 and a second inclined wall 58 spaced apart along the frame 54.

In assembly, the hammer 50 is pivotally mounted onto the sprinkler body 12 such that the central seat 51 is mounted on the seating arrangement of the sprinkler body 12, and the top pin 53 is received within the central aperture 24 of the hammer frame 20. The hammer 50 is biased by a biasing spring 28 held between the top wall 22 of the hammer frame 20 and the spring seating 55 of the hammer 50.

The impact sprinkler 1 described above is a standard impact sprinkler known in the art and operation thereof is known per se, and therefore will not be described herein.

Figure 2A:
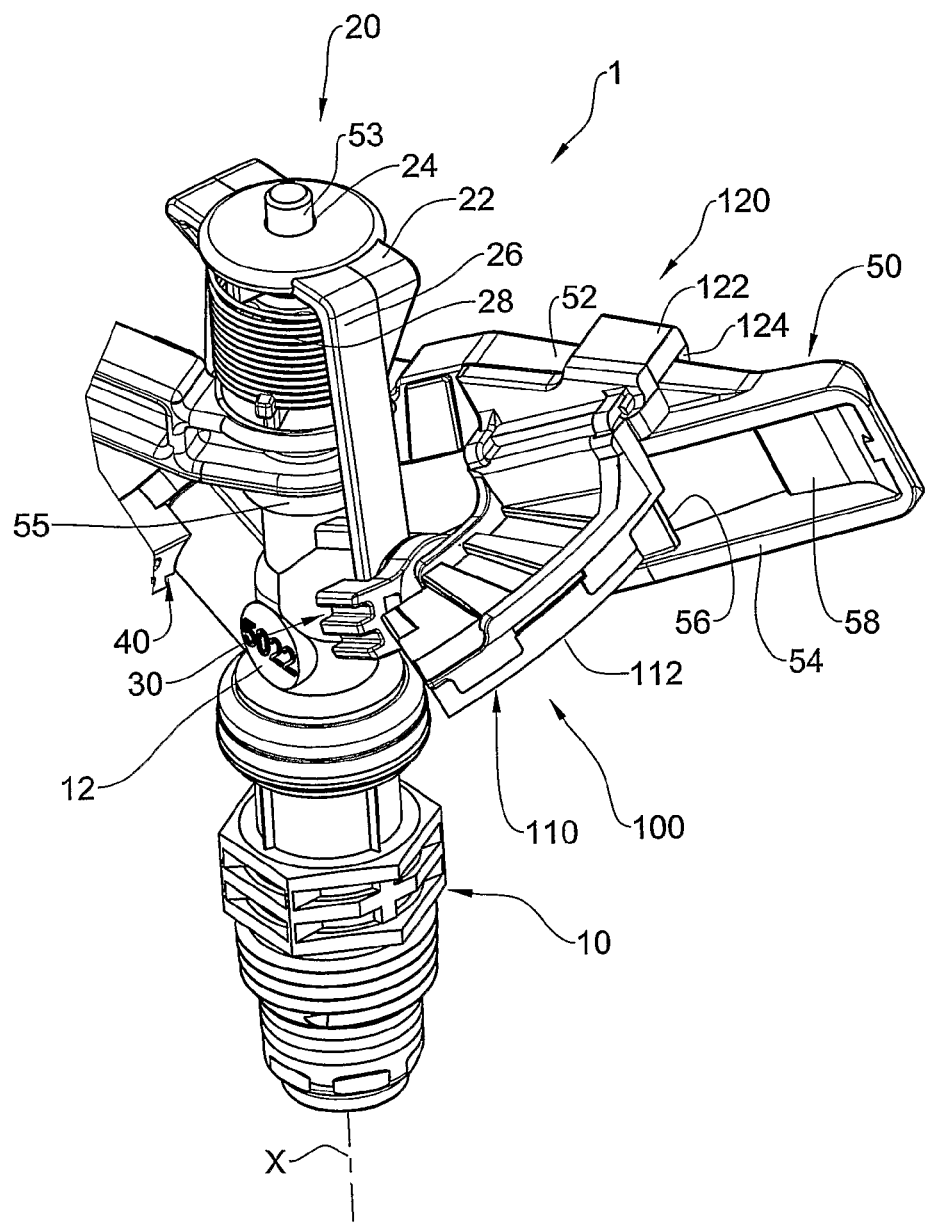
FIG. 2A is an enlarged isometric front view of the impact sprinkler shown in FIG. 1 comprising a deflecting member according to the present invention.

Turning now to FIG. 2A, the sprinkler 1 is shown with a deflecting member 100 according to the present invention fixedly mounted thereto, the deflecting member 100 comprising a deflecting portion 110, a mounting portion 120 and a clearance portion 130. In mounting the deflecting member 100 onto the impact sprinkler 1, the mounting portion 120 is adapted for engaging the frame 54 of the moment generating portion 52a of the hammer body 52.

Figure 3A:
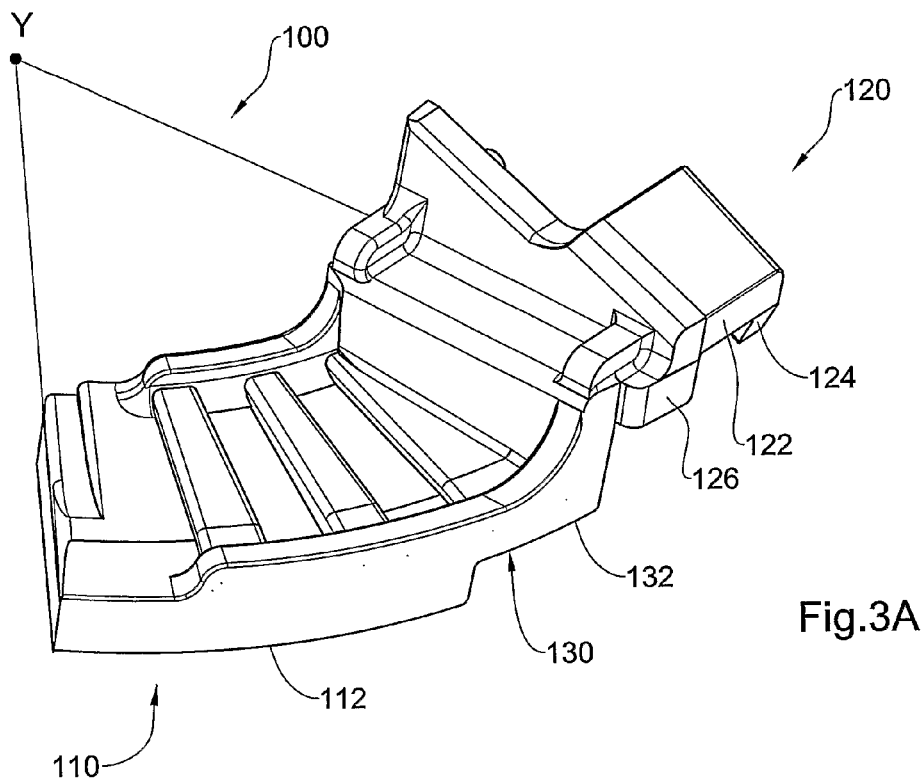
FIG. 3A is an isometric view of the deflecting member of the present invention used in the impact sprinkler shown in FIGS. 2A to 2E.
Figure 3B:
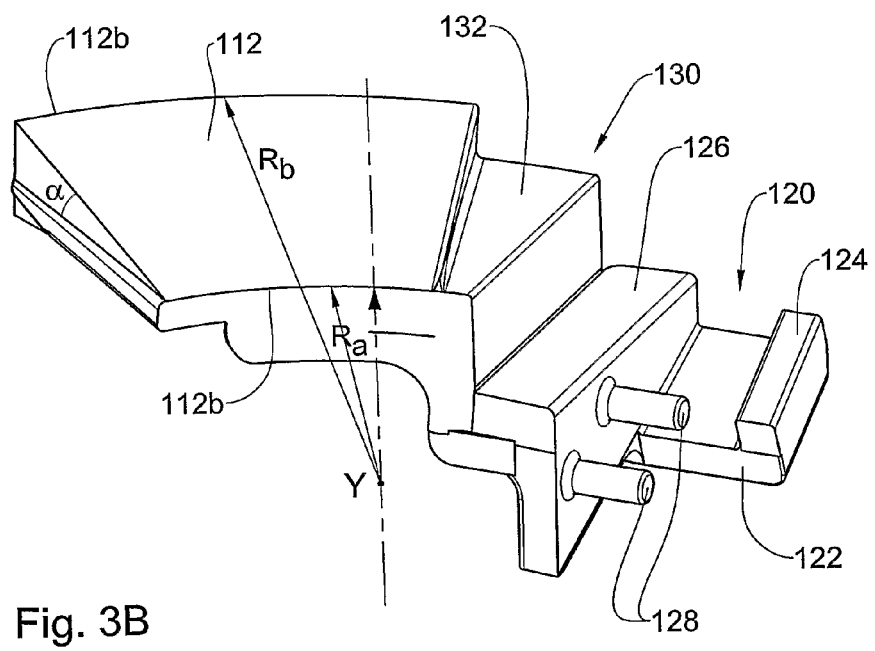
FIG. 3B is a bottom isometric view of the deflecting member shown in FIG. 3A.

With reference to FIGS. 3A and 3B, the deflecting member 100 extends circumferentially about a central axis Y located outside the deflecting member 100. The deflecting portion 110 of the deflecting member 100 if formed with a deflective surface 112 extending between a first edge 112a and a second edge 112b of corresponding radii $R_a$ and $R_b$ about the central axis Y.

The mounting portion 120 of the deflecting member 100 is formed with a mounting bridge 122 having formed a first and a second shoulders 124, 126 respectively on either side thereof. The second shoulder 126 is formed with two connecting pins 128 extending substantially parallel to the bridge 122, adapted to be received within the hammer 50 of the impact sprinkler 1.

Between the deflecting portion 110 and the mounting portion 120, a clearance portion 130 is formed. The clearance portion 130 is formed with a clearance surface 132, angled by α to the deflective surface 112.

Figure 2B:
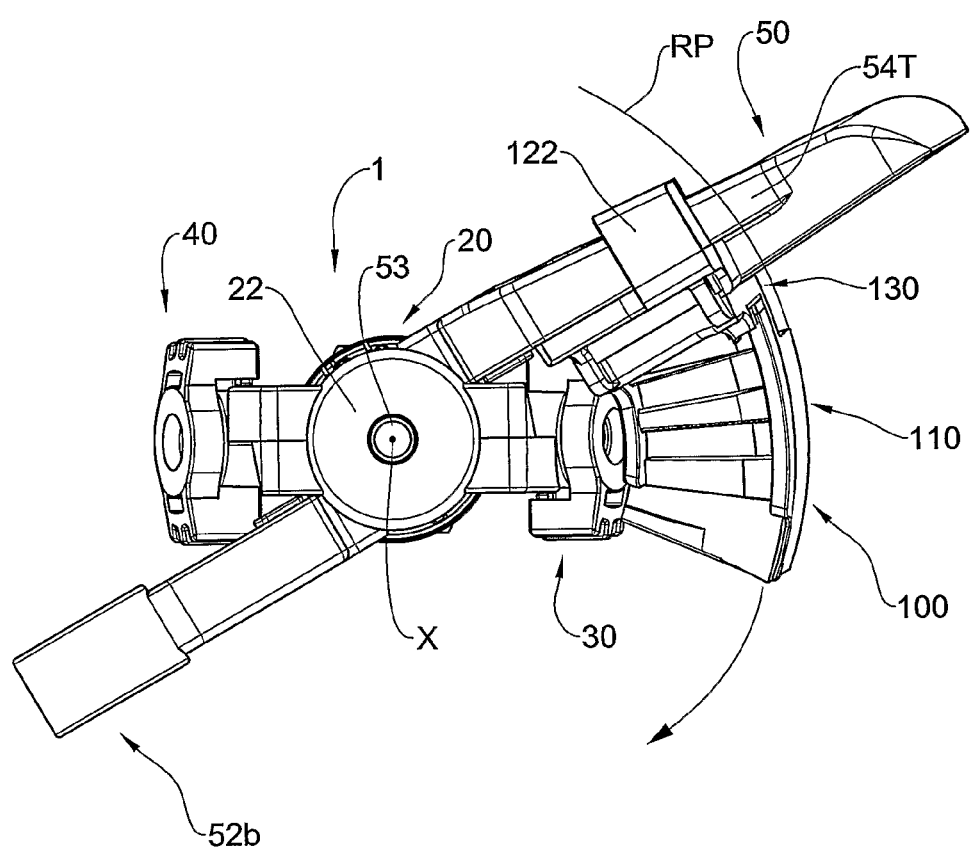
FIG. 2B is a top view of the impact sprinkler shown in FIG. 2A, at an intermediate position of the hammer thereof.
Figure 2C:
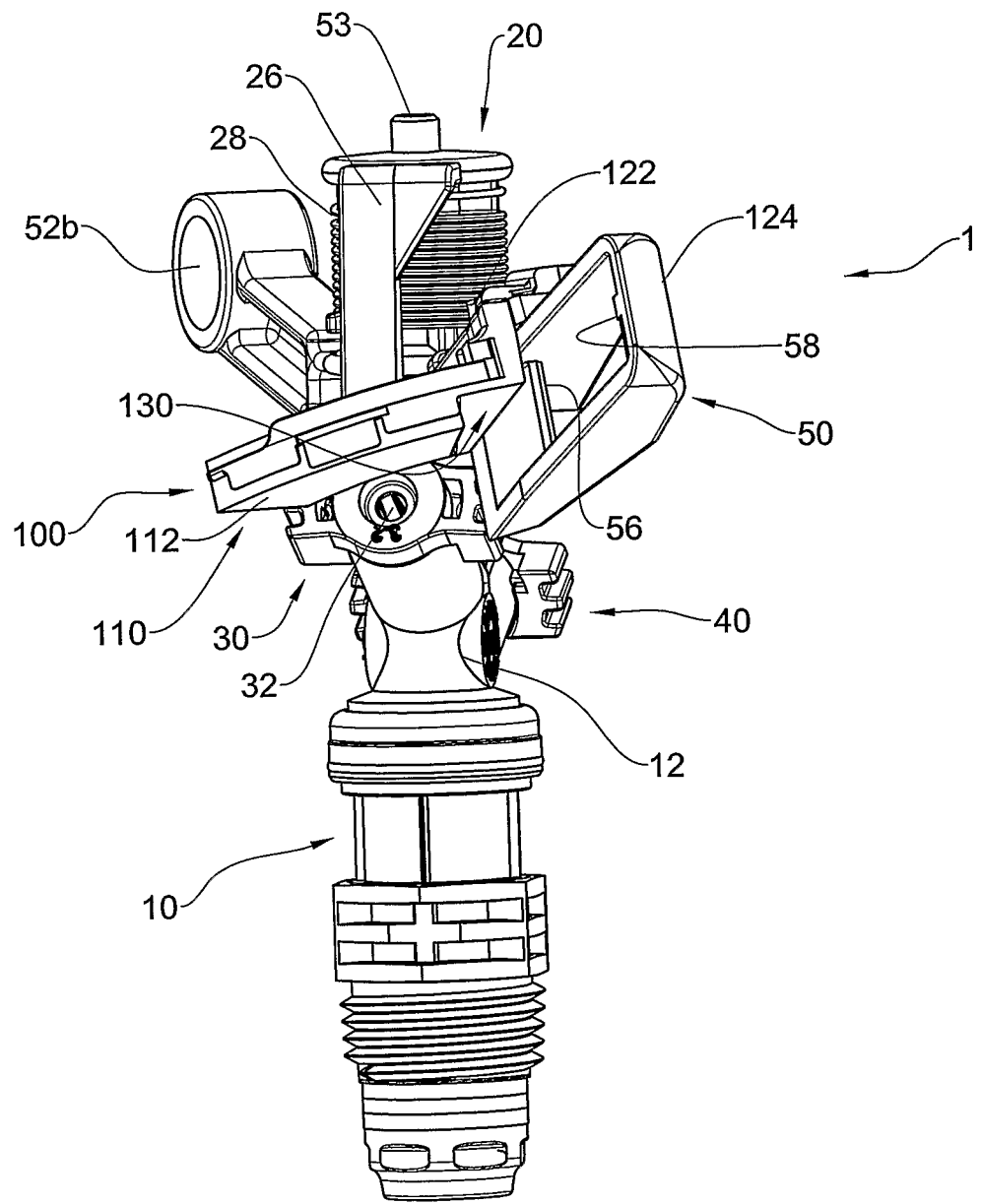
FIG. 2C is a front view of the impact sprinkler shown in FIG. 2A.
Figure 2D:
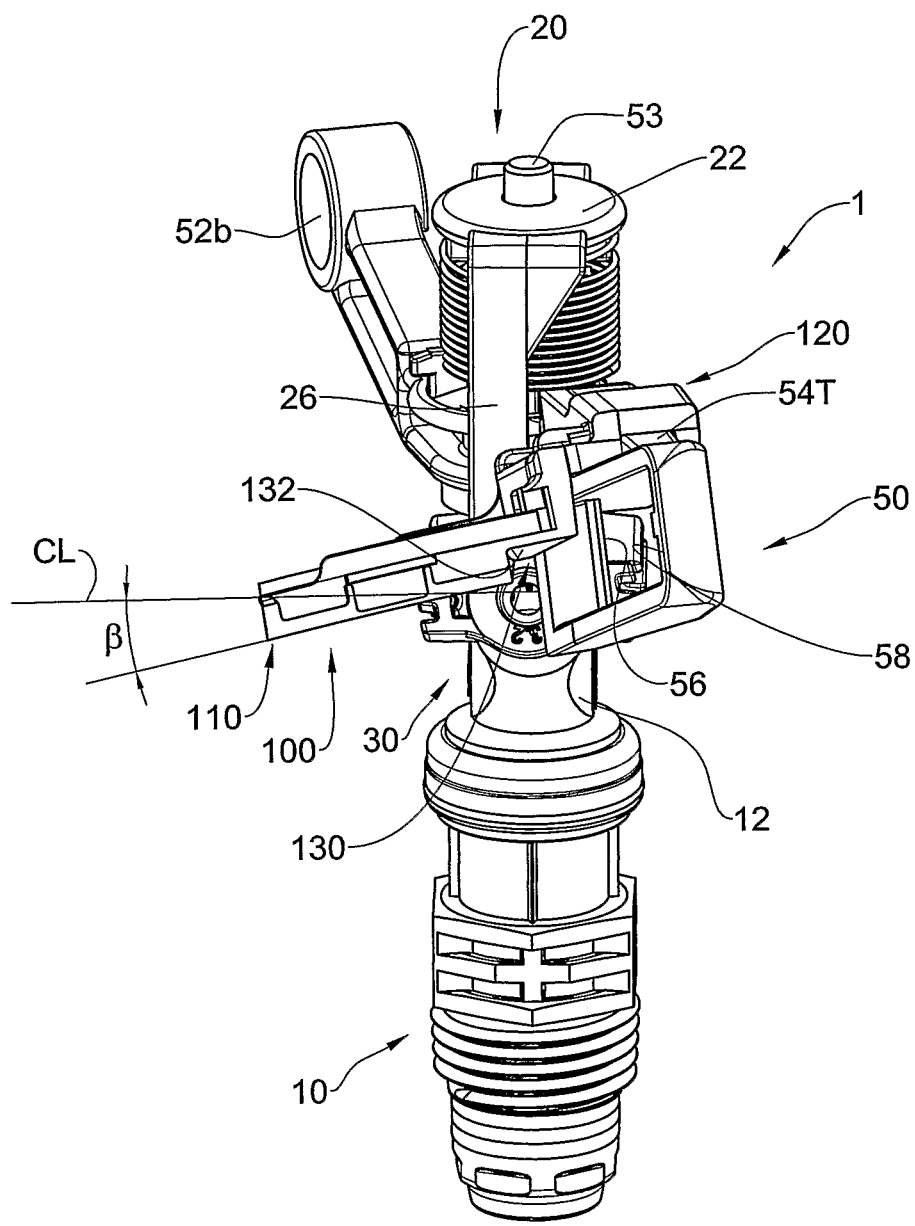
FIG. 2D is a tilted front view of the impact sprinkler shown in FIG. 2A.
Figure 2E:
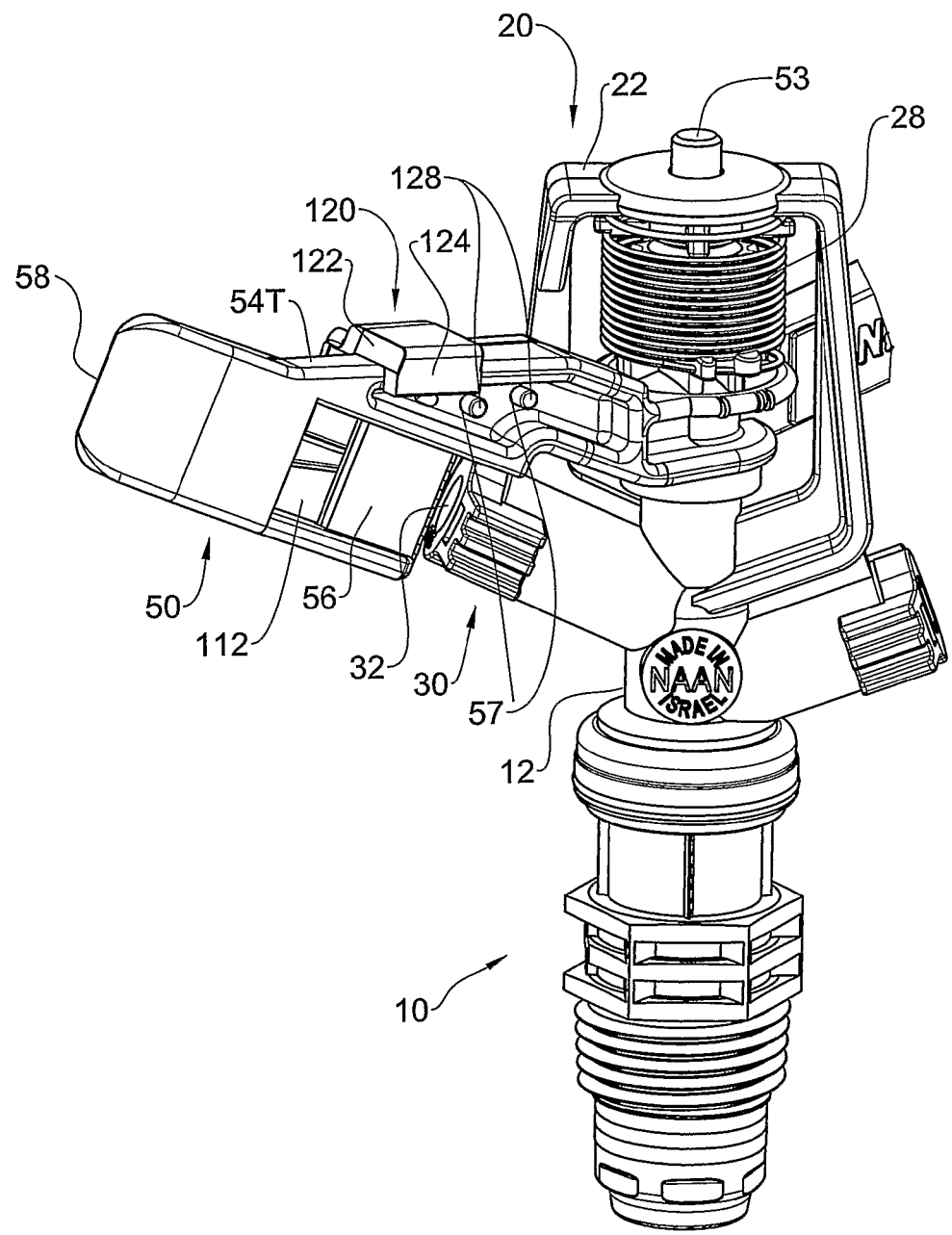
FIG. 2E is an enlarged side view of the impact sprinkler shown in FIG. 2A.

Turning now to FIGS. 2B and 2E, the deflecting member 100 is mounted onto the impact sprinkler 1 such that the deflecting member 100 extends along the rotary path RP of the impact sprinkler 1. In the mounted position, the bridge 122 rests on a top surface 54T of the frame 54, and the shoulders 124, 126 secure the deflecting member 100 to the frame 54 on each side thereof. The connecting pins 128 are received within two corresponding holes 57 of the frame 54.

Figure 3C:
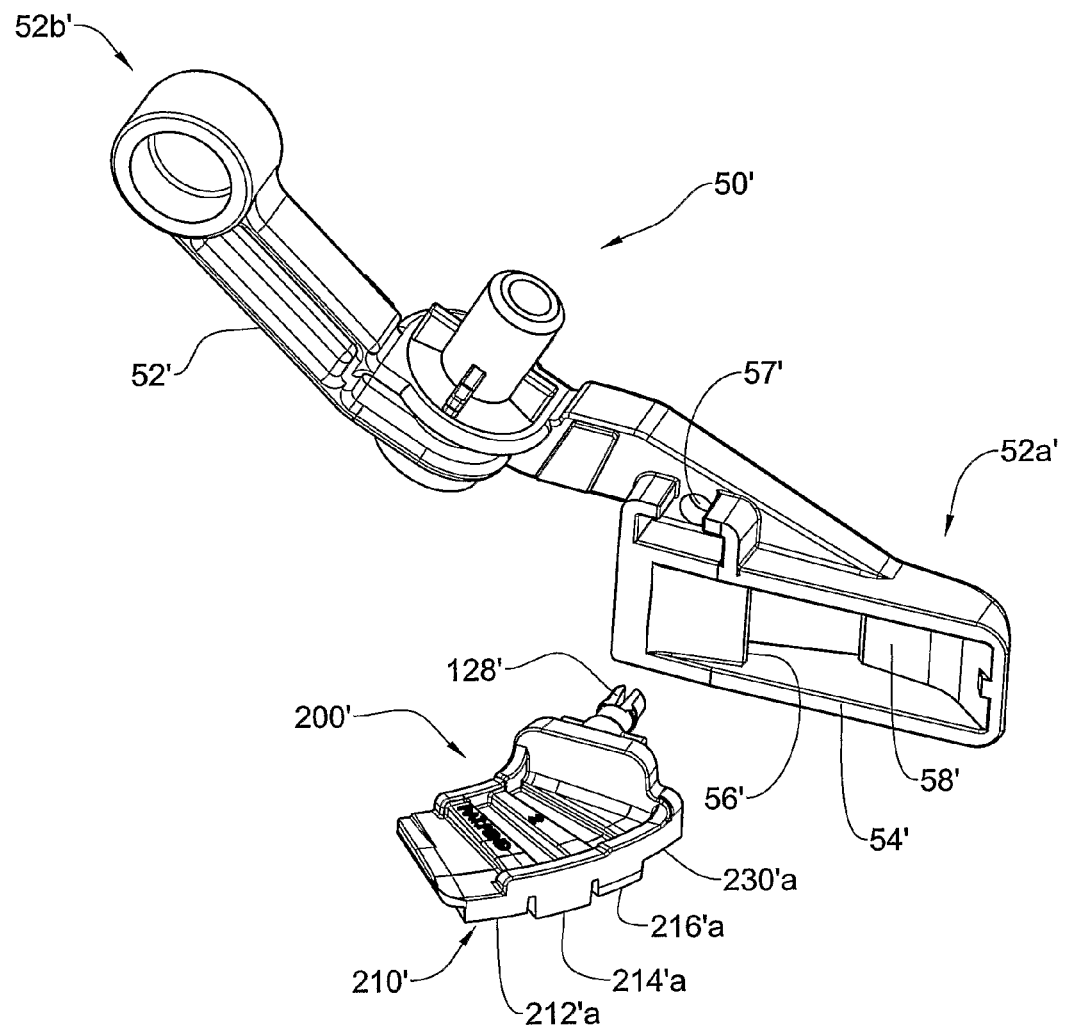
FIG. 3C is a schematic exploded isometric view of a sprinkler hammer and deflecting member according to another example of the present invention.

With reference to FIG. 3C, another example of a hammer, generally designated 50', is shown where the snap engagement is constituted by a single hole 57' formed in the hammer frame 54', and a single pin 128' formed in the deflecting member 200'.

With additional reference to FIGS. 2C and 2D, when mounted onto the impact sprinkler 1, the deflections surface 112 is angled at 13 to a center line CL crossing the opening 32 of the nozzle 30. It is observed that the deflecting member 100 is mounted such that at a specific position shown in FIGS. 2C and 2D the clearance portion 130 thereof faces the opening 32 of the nozzle 30. It is also observed that part of the nozzle opening 32 is obstructed by the first inclined wall 56 of the hammer frame 54.

Figure 4A:
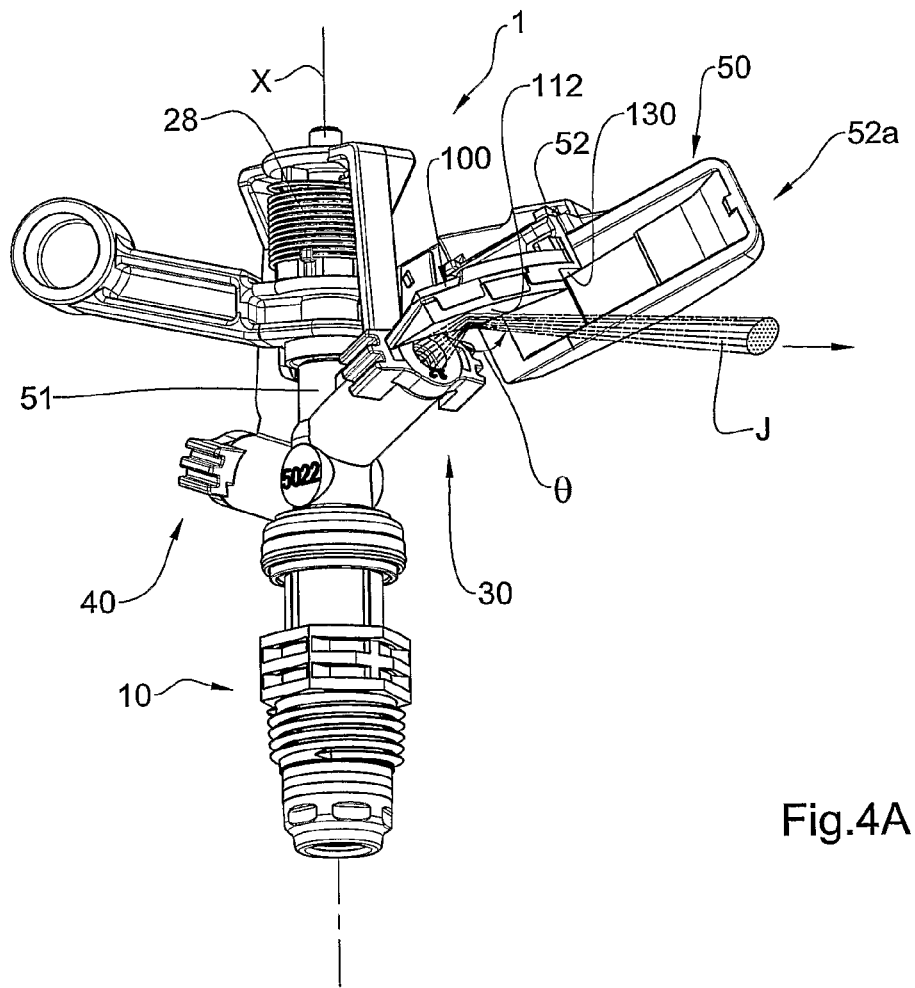
FIG. 4A is a schematic isometric view illustrating deflection of a directional jet by a deflecting member shown in FIGS. 2A to 2E.
Figure 4B:
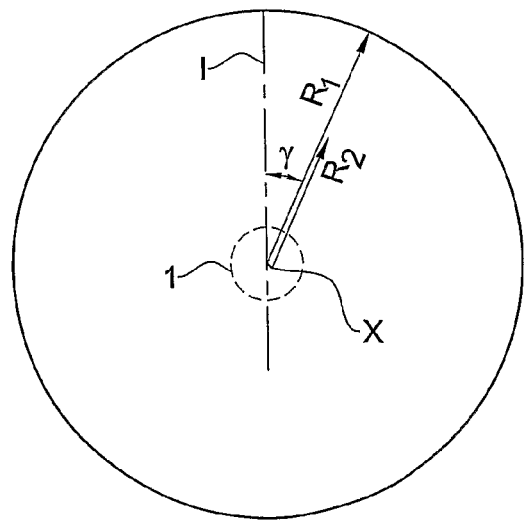
FIG. 4B is a schematic illustration of an irrigation cycle performed by the impact sprinkler and deflecting member as shown in FIG. 2A.

With reference now also to FIGS. 4A and 4B, the operation of the rotary sprinkler 1 will now be described. In FIGS. 4A and 4B, there is shown a deflecting member 100 having a different deflecting surface design. Nonetheless, the following description pertains to all design examples of the deflecting member.

In operation, during rotary motion of the hammer 50 about the central axis X of the impact sprinkler 1, the deflecting member 100, being fixedly connected thereto, is displaced along with the hammer 50 along the rotary path RP. A single reciprocal movement of the hammer 50 with the deflecting member 100 mounted thereon may be broken down to the following segments:

Moment generating segment—During this segment, a directional jet (shown FIG. 4A) is emitted from the opening 32 of the nozzle 30, and impacts the first and second inclined walls 56, 58 of the hammer frame 54. This impact imparts rotary motion to the hammer 50, whereby the hammer frame 54 is displaced such that it does not obstruct the nozzle opening 32.

First long distance segment—After displacement of the hammer frame 54, the nozzle opening 32 is faced with the clearance portion 130 of the deflecting member 100. In this position, the directional jet is free to be discharged from the nozzle 30 without obstructions.

Deflected segment (shown also FIG. 4A)—thereafter, due to the rotary motion of the hammer 50, the clearance portion 130 is displaced away from the nozzle opening 32, and the nozzle opening 32 is faced with the deflective surface 112. The deflective surface 112 deflects the directional jet downwards, effectively changing the range of irrigation thereof, determined by the angle α (shown FIG. 3B) and the location of impact of the jet on the deflective surface 112. Furthermore, during the rotary motion of the deflective surface 112 with respect to the nozzle opening 32, due to the inclination β of the deflections surface 112, the irrigation range progressively varies. It is noted that this inclination angle β is not compulsory and that the point of impact of the jet may be changed simply by the orientation of the deflecting member with respect to the nozzle 30.

It should further be noticed with respect to FIG. 4A, that the directional jet J emitted from the nozzle 30 is deflected at an angle θ from the deflective surface 212, the angle θ being dependent on the point of impact of the jet J on the deflective surface 212, and as previously mentioned, on the angular position of the hammer 50 with respect to the nozzle 30. It should also be appreciated that the jet J as depicted in FIG. 4A is intended to demonstrate the general deflection direction of the jet J rather than the actual dispersion of the irrigation fluid.

Second long distance segment (optional)—Since angular rotation of the hammer 50 is determined according to the water pressure of the directional jet and the biasing force of the biasing spring 28, the sprinkler 1 may sometimes reach a position in which the hammer 50 is so angularly displaced that the nozzle opening 32 is no longer faced with the deflective surface 112, and the directional jet is free to be discharged with no obstructions, similar to the position during the first long distance segment.

Return segment—Since the hammer 50 is biased by the spring 28, the hammer 50 is forced to return to its initial position. During such return, the above segments take place in a reverse order. Upon return, the walls 54, 56 of hammer 50 first become faced with the nozzle opening 32, whereby impact of the directional jet thereon adds to the return momentum of the hammer 50. Thereafter, the hammer 50 impacts the mounting frame 20 and causes angular displacement of the sprinkler body 12 with respect to the base connector 10, as known per se.

During the segments described above, the irrigation range is effectively changed due to deflection of the directional jet by the deflecting member 100. After a certain number of reciprocal movements as described above, the impact sprinkler will be urged to complete a full 360° turn of the sprinkler body 12 about the central axis X. Such a full turn will be referred to herein as an irrigation cycle. Since the nature of operation of an impact sprinkler is essentially random, i.e. the angular displacement of the sprinkler body 12 about its axis X is not predetermined or constant, the irrigation range is effectively changed not only during reciprocal motion of the hammer 50, but also during a full turn of the entire sprinkler body 12 itself.

In other words, during the first irrigation cycle, the sprinkler body 12 reaches an angular position in which the directional jet is directed at an angle γ from the initial reference line I. In this case, for example, the impact sprinkler 1 reaches this position when the nozzle opening 32 faces the clearance portion 130, whereby the directional jet is provided with its full irrigation range $R_1$. After completion of the first irrigation cycle, and engaging in a second irrigation cycle, the sprinkler 1 again reaches the angular position γ, wherein the irrigation range is now $R_2$ which is shorter than $R_1$. Statistically, the chances that the directional jet will have the same irrigation range, at the same angular position of the impact sprinkler 1 at two different irrigation cycles are essentially low.

Figure 5:
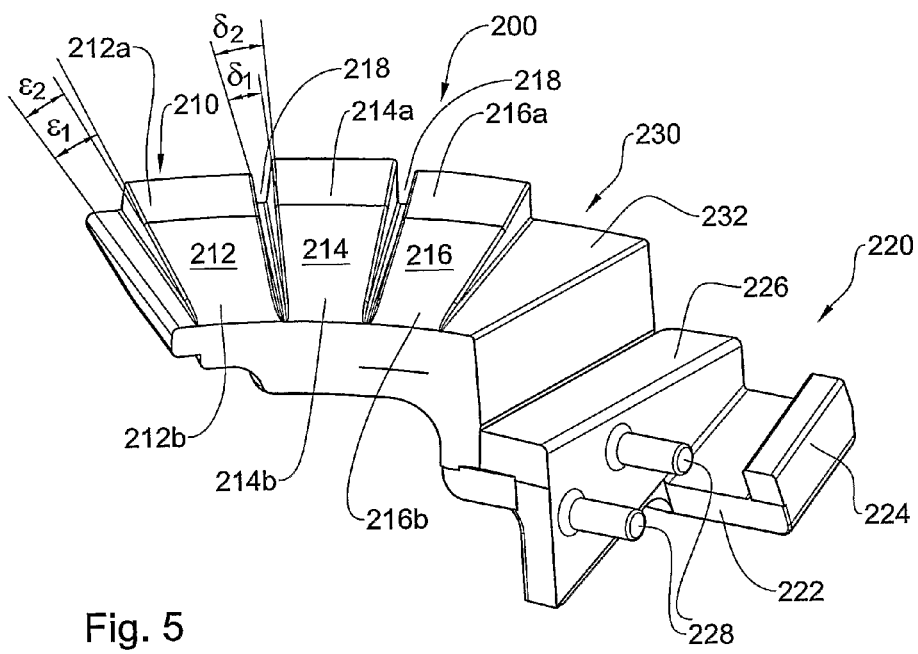
FIG. 5 is a bottom isometric view of a deflecting member according to another embodiment of the present invention.

Turning now to FIG. 5, another embodiment of a deflecting member, generally designated 200 is shown comprising a deflecting portion 210, a mounting portion 220 and a clearance portion 230, the mounting portion 220 and clearance portion 230 being essentially similar to the corresponding portions 120, 130 of the previous embodiment.

The deflecting portion comprises a central deflective surface 212, and two peripheral deflective surfaces 214 and 216 respectively, all three being arranged consecutively along the deflecting portion 210 and separated by grooves 218. The central deflective surface has a first section 212a angled at $δ_1$ to the clearance surface 232, and a second section 212b angled at $δ_2$ to the clearance surface 232. Each of the peripheral sections 214, 216 also comprise a first section angled at $S_i$ to the clearance surface 232 and a second section angled at $ε_2$ to the clearance surface 232.

Thus, in operation, when using the deflecting member 200 described above, the angle of deflection of the directional jet, and consequently the irrigation range thereof, is effectively changed during rotary motion of the hammer 50. It should be understood that irrigation range may be regulated by designing the deflecting member 200 to have a desired number of deflective surfaces.

Figure 6:
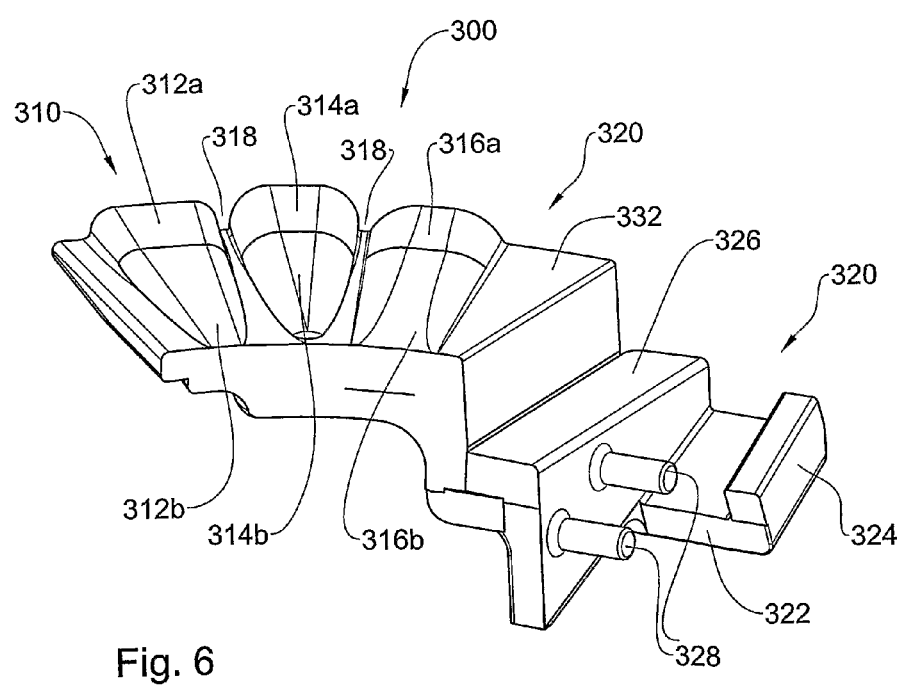
FIG. 6 is a bottom isometric view of a deflecting member according to a further embodiment of the present invention.

With reference to FIG. 6, yet another embodiment of the deflecting member is shown, generally designated 300. The deflecting portion 310 of the deflecting member 300 comprises a first deflective surface 312, a second deflective surface 314, and a third deflective surface 316, separated therebetween by grooves 318. Each of the deflective surfaces 312, 314, 316 is formed with two sections, each being inclined at a different angle with respect to the clearance surface 332.

Figure 7A:
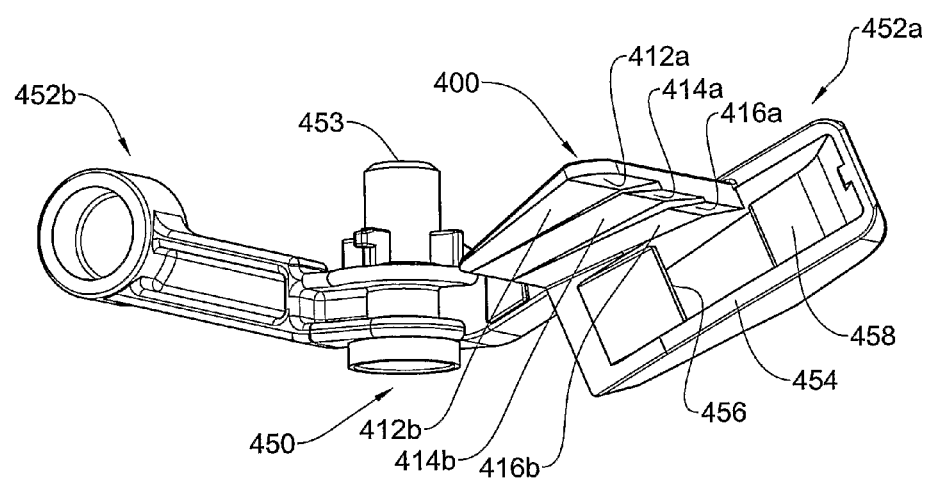
FIGS. 7A and 7B are respective schematic bottom and top isometric views of a deflecting member according to the present invention, which is integrally formed with a reciprocating element of a rotary sprinkler.
Figure 7B:
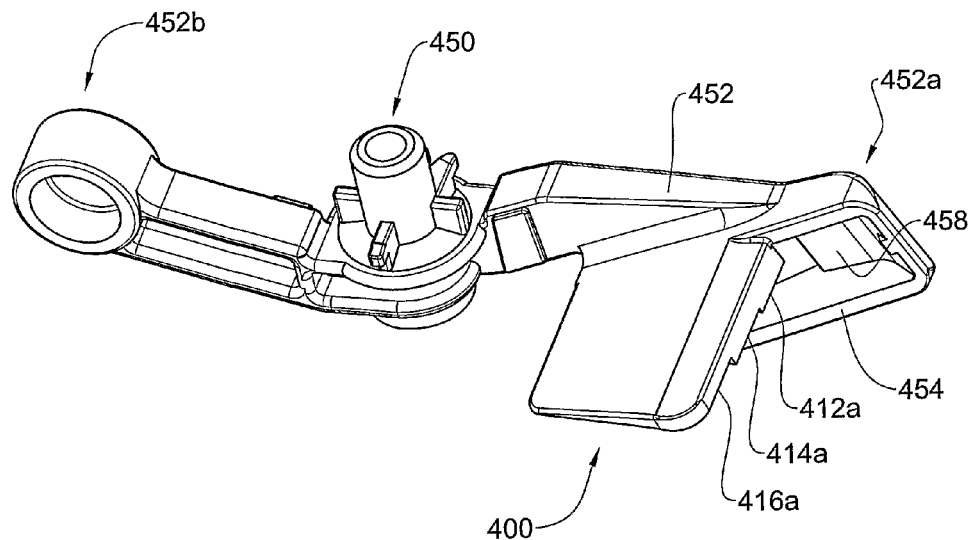

Turning now to FIGS. 7A and 7B, another embodiment of a deflecting member is shown, generally designated 400, which is generally similar to the deflecting member 200 shown in FIG. 5. However, in the present case, the deflecting member 400 is integrally formed with the hammer 450 of the rotary sprinkler 1 to form a single unit. An advantage of such a design may be the ease of manufacture, since the deflecting member 400 and hammer 450 may be manufactured by injection molding in a single operation.

Figure 8A:
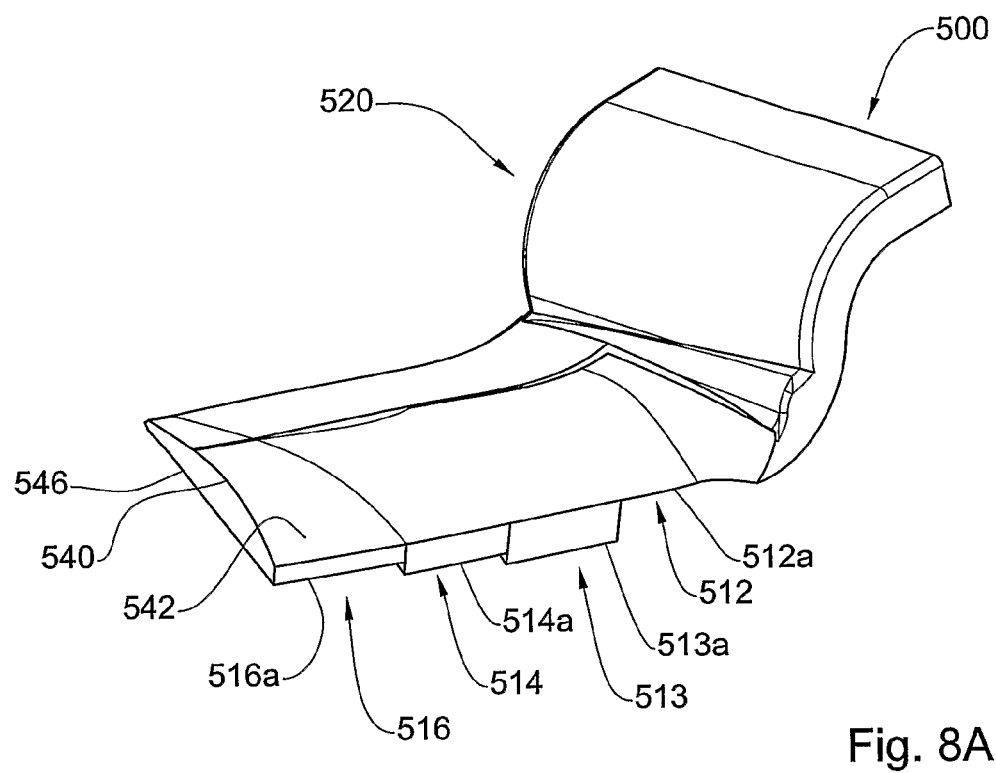
FIGS. 8A and 8B are schematic isometric and side views of a deflecting member according to another embodiment of the present invention.
Figure 8B:
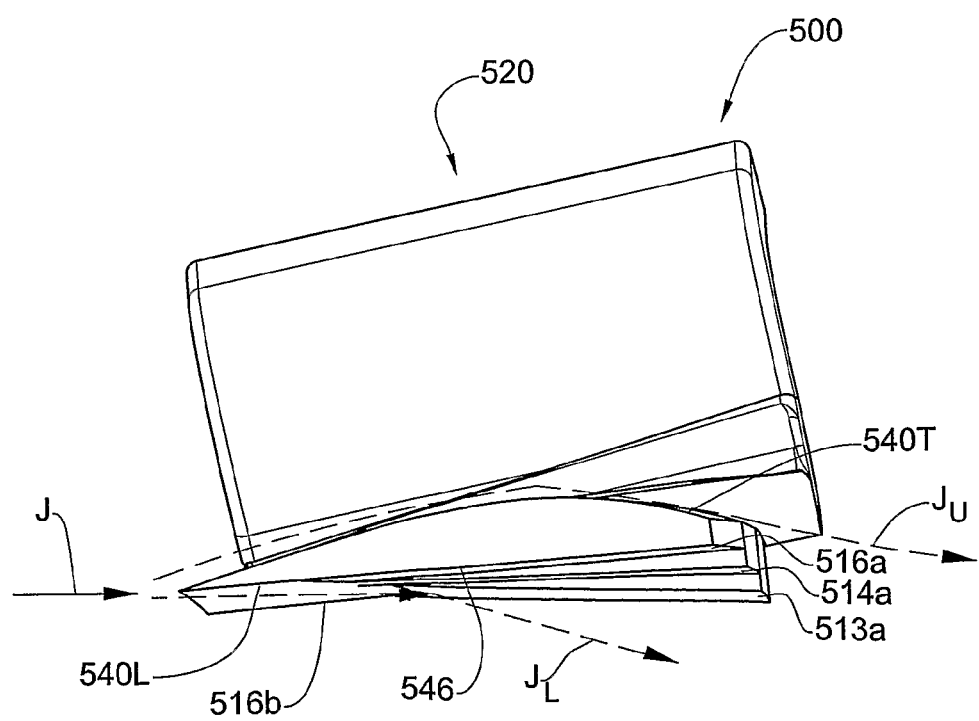

Attention is now drawn to FIGS. 8A and 8B, in which another design of the deflecting member is shown generally designated 500. The deflecting member 500 comprises, similarly to the deflecting members 200, 300 and 400 deflective sub-surfaces. In this example there are four deflective sub-surfaces 512, 513, 514 and 516 respectively. In addition, the deflecting member 500 has a wing-like profile 540, being formed with a top surface 542 having a curvature similar to a wing of a plane. As can be seen best in FIG. 8A, each of the four deflective sub-surfaces 512, 513, 514 and 516 extend a different distance from the top surface 542, with sub-surface 512 being the closed to top surface 542, sub-surface 516 being extended further from top surface 542 than sub-surface 512, sub-surface 514 being extended further from top surface 542 than sub-surface 516, and sub-surface 513 being extended further from top surface 542 than sub-surface 516.

In assembly, the deflecting member 500 is so arranged in front of the nozzle 30 of the sprinkler 1, that the directional jet J emitted from the nozzle 30 is directed towards the sharp lead end 540L of the wing-like profile 540.

In operation, the directional jet J is split by sharp lead end 540L of the wing-like profile into an upper portion $J_U$ and a lower portion $J_L$. The lower portion $J_L$ of the directional jet is deflected by the deflective surfaces 512, 513, 514 and 516 in a manner similar to that disclosed with respect to the above operation segments. The upper portion $J_U$ however, is urged to travel along the top surface 542 of the wing-like profile 540 due to hydrodynamic laws, and is eventually disengaged from the top surface 542 at a different angle than that of the lower portion $J_L$.

The above arrangement allows reducing the upward force on the deflecting member 500 and consequently the hammer 50, by the deflective surface being impacted only by a portion of the directional jet. It should also be noted that the upper jet $J_U$ may provide a counter-force acting downwards on the deflecting member 500.

Figure 9:
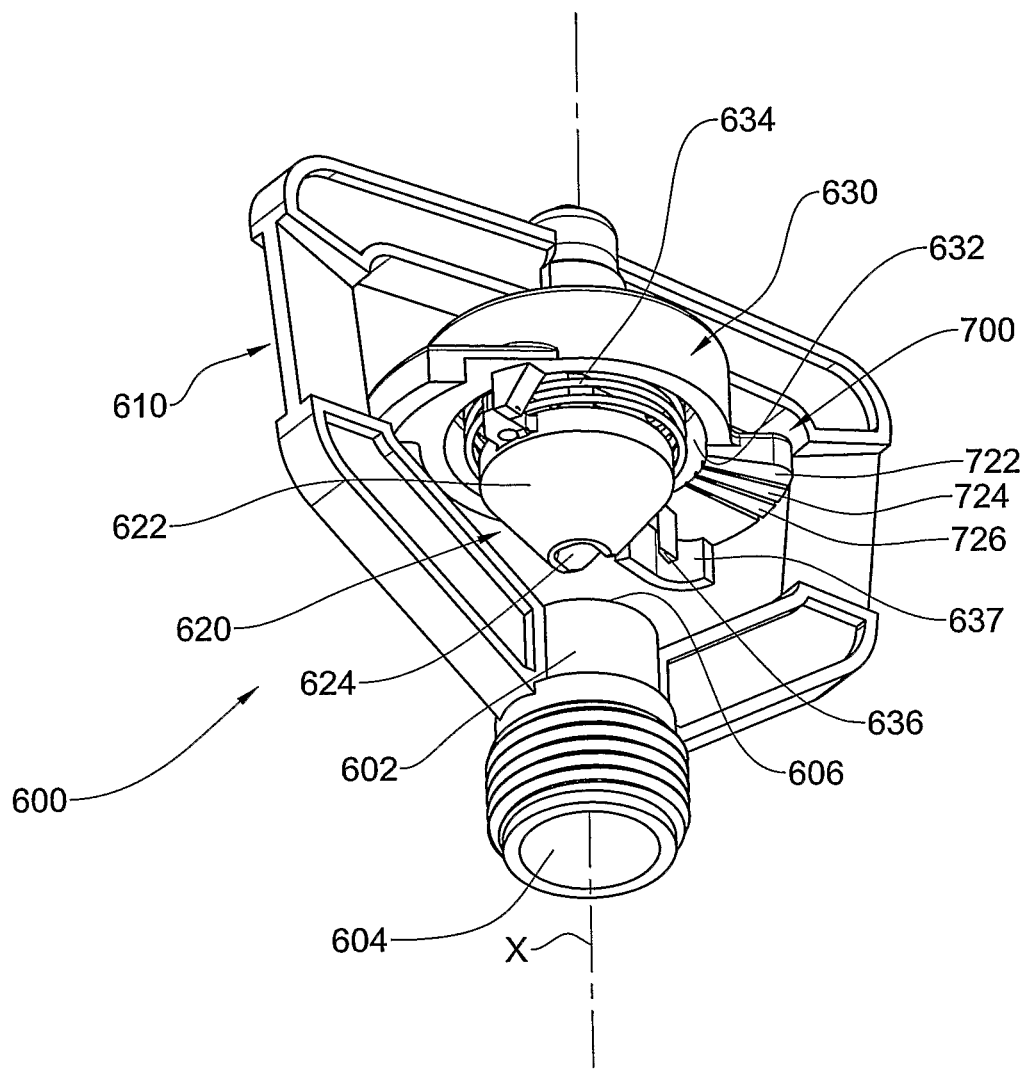
FIG. 9 is a schematic isometric view of a sprinkler comprising a deflecting member according to a further embodiment of the present invention

Turning now to FIG. 9, a rotary sprinkler generally designated 600 is shown comprising a frame 610, a rotary irrigation mechanism 620 and a reciprocal arrangement 630 and a deflection member 700, constituting a part thereof. The difference between the deflecting member 700 and the previously discussed deflecting members 100 to 500, is that the deflecting member that the reciprocal element onto which the deflecting member 700 is mounted, is not part of the movement generating mechanism.

The sprinkler 600 has a fluid channel 602 having a first open end 604 in order to receive and irrigation fluid, and an opposite open end 606 in order to discharge the irrigation fluid. The rotary irrigation mechanism 620 has a body 622 of conical form and is formed with a tilted channel 624 (not completely visible) adapted for receiving the irrigation fluid discharged from the open end 606, funneling it to become a directional jet, and diverting the directional jet towards the reciprocal arrangement 630.

The reciprocal arrangement 630 is mounted onto the movement generating mechanism and is biased by a biasing spring 634. The reciprocal arrangement is formed with a first and a second deflective wall 636, 637 adapted for deflecting the directional jet similarly to deflective walls 56 and 58 of the hammer 50 shown in FIGS. 2A to 2E.

In operation, the impact of the irrigation fluid at the titled channel 624 causes the rotary irrigation mechanism 620 to change its angular position, thereby changing the angular direction of the directional jet.

Due to the impact of the directional jet on the deflective wall applying force to one rotary direction, and the biasing spring operating against such force, the reciprocal element 630 is urged to perform reciprocal rotary motion about the rotary irrigation mechanism 620 during operation thereof, similar to the reciprocal motion of the hammer 50 previously discussed. However, is should first be stressed out that the reciprocal arrangement 630 does not have a frame (such as frame 20 in FIGS. 2A to 2E) to impact and therefore does not effect the rotary irrigation mechanism to such an extent as the hammer 50 effects the rotary sprinkler 1.

The deflecting member 700 is formed similarly to the deflecting members previously discussed, having three sub-surfaces 712, 714 and 716. The deflecting member travels with the reciprocal arrangement 630, thus its manner of operation is generally the same as disclosed with respect to FIGS. 2A to 2E.

Those skilled in the art to which this invention pertains will readily appreciate that numerous changes, variations, and modification can be made without departing from the scope of the invention, mutatis mutandis.

The invention claimed is

1. A sprinkler configured for irrigation of a predetermined area, said sprinkler comprising:
   a sprinkler body having a central axis, and formed with a an irrigation inlet configured for receiving irrigation fluid, and a nozzle configured for discharging there through a directional jet of said irrigation fluid, said sprinkler further comprising a reciprocal element configured for performing a reciprocal rotary motion about said central axis, and a deflecting member comprising an attachment mechanism for fixed engagement thereof with said reciprocal element, and at least a first deflective surface, said deflecting member being configured for performing a reciprocal rotary motion about said central axis together with said reciprocal element, said deflecting member having a first portion and a second portion, said second portion being angled relative to said first portion and circumferentially spaced from said first portion about the central axis,
   wherein said deflecting member is configured to assume at least a first position with respect to said nozzle in which said first portion faces said nozzle, by virtue of which the directional jet emitted from said sprinkler and impinging on said first portion is deflected at a first angle yielding a first irrigation range of the sprinkler, and at least a second position with respect to said nozzle in which said second portion faces said nozzle, by virtue of which the directional jet emitted from the sprinkler and impinging on said second portion is deflected at a second angle different from the first angle, yielding a second irrigation range different than the first irrigation range.

2. A sprinkler according to claim 1, wherein the deflective surface of said deflecting member is disposed above said nozzle in a position angled thereto, configured for downward deflection of a directional jet emitted therefrom.

3. A sprinkler according to claim 1, wherein the deflective surface of said deflecting member is disposed in front of said nozzle, configured for dividing a directional jet emitted therefrom into a first jet portion and a second jet portion each having a different angle with respect to the central axis along a plane on which said central axis lies.

4. A sprinkler according to claim 1, wherein said deflective surface is configured for deflecting said directional jet at a variable angle depending on the point of impact thereof on the deflective surface and the angular position of said reciprocal element.

5. A sprinkler according to claim 4, wherein said deflective surface is a continuous non-planar deflective surface having multiple curvature radii, configured for deflecting said directional jet at a variable angle depending on the point of impact thereof on the deflective surface and the angular position of said reciprocal element.

6. A sprinkler according to claim 4, wherein said deflective surface comprises a plurality of deflective sub-surfaces, said deflective surface being configured for deflecting said directional jet at a variable angle depending on the sub-surface impacted by said jet.

7. A sprinkler according to claim 1, wherein said deflecting member comprises a clearance portion such that when said reciprocal element is angularly displaced to a predetermined clearance position, a clearance exists along the circumferential direction between a deflective wall of said reciprocal element and the deflective surface of said deflecting member.

8. A sprinkler according to claim 1, wherein said deflective surface is made of a flexible material attached to a rigid deflecting member.

9. A sprinkler according to claim 8, wherein said rigid deflecting member comprises a plurality of flexible deflective surfaces.

10. A sprinkler according to claim 9, wherein said deflective surface is configured for deflecting said directional jet at a variable angle depending on the point of impact thereof on the deflective surface and the angular position of said reciprocal element.

11. A sprinkler according to claim 10, wherein said deflective member is further configured for deflecting said directional jet at a variable angle depending on the change of shape of said flexible deflective surface.

12. A sprinkler according to claim 1, wherein said sprinkler is an impact sprinkler, and wherein said reciprocal element is a hammer constituting a part of a motion generating mechanism of said impact sprinkler.

13. A deflecting member for a reciprocal element of a sprinkler configured for emitting a directional jet through a nozzle thereof, said deflecting member comprising a body formed with at least a first deflective surface having a first portion and a second portion, said second portion being angled relative to said first portion and circumferentially spaced from said first portion about the central axis, said deflecting member further comprising an attachment mechanism configured for attachment thereof to said reciprocal element, said first deflective surface is configured for deflecting said jet when said deflecting member is mounted onto said sprinkler, wherein said deflecting member is configured to assume at least a first position with respect to said nozzle in which the first portion thereof faces said nozzle, by virtue of which the directional jet emitted from the sprinkler and impinging on said first portion is deflected at a first angle yielding a first irrigation range of the sprinkler, and at least a second position with respect to said nozzle in which the second portion thereof faces said nozzle, by virtue of which the directional jet emitted from the sprinkler and impinging on said second portion is deflected at a second angle, different from the first angle, yielding a second irrigation range different than the first range.

14. A deflecting member according to claim 13, wherein said deflective surface is a continuous deflective surfaces having multiple curvature radii, configured for deflecting said directional jet at a variable angle depending on the point of impact thereof on the deflective surface and the angular position of said reciprocal element.

15. A deflecting member according to claim 13, wherein said deflective surface comprises a plurality of deflective sub-surfaces, said deflective surface being configured for deflecting said directional jet at a variable angle depending on the sub-surface impacted by said jet.

16. A deflecting member according to claim 13, wherein said deflecting member comprises a clearance portion such that when mounted onto said reciprocal element, and when said reciprocal element is angularly displaced to a predetermined clearance position, a clearance exists along the circumferential direction between a deflective wall of said reciprocal element and the deflective surface of said deflecting member.

17. A sprinkler according to claim 13, wherein said deflective surface is made of a flexible material attached to a rigid deflecting member.

18. A sprinkler according to claim 17, wherein said rigid deflecting member comprises a plurality of flexible deflective surfaces.

19. A deflecting member according to claim 13, wherein said sprinkler is an impact sprinkler and said reciprocal element is a hammer constituting a part of a motion generating mechanism of said impact sprinkler.

* * * * *